June 16, 1942.  E. F. BOETTCHER  2,286,456
TRACK INSPECTION GAUGE
Filed May 8, 1940
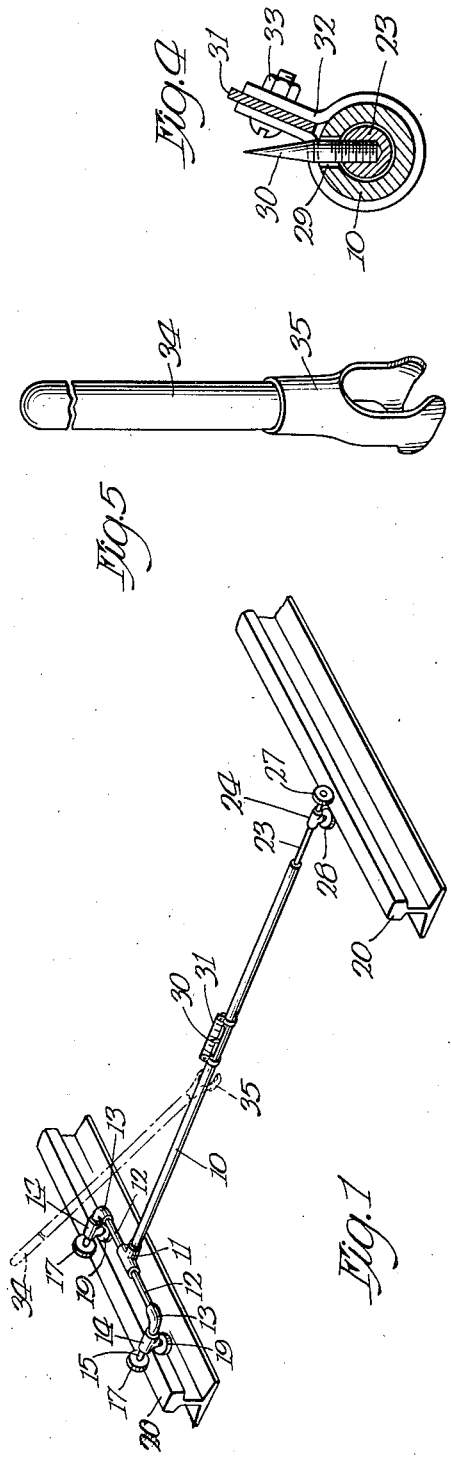
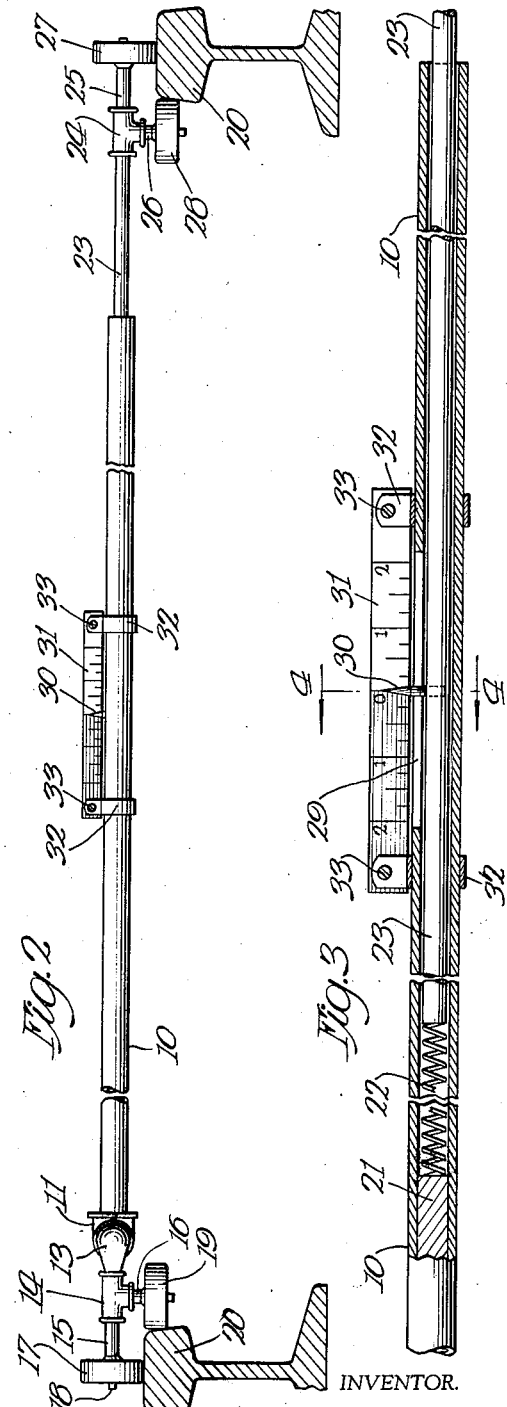
INVENTOR.
BY *Edgar Franklin Boettcher*
*Mann, Brown & Co.*
ATTORNEYS.

Patented June 16, 1942

2,286,456

UNITED STATES PATENT OFFICE 2,286,456

TRACK INSPECTION GAUGE

Edgar Franklin Boettcher, Aberdeen, S. Dak.

Application May 8, 1940, Serial No. 333,910

2 Claims. (Cl. 33—146)

The principal object of this invention is to provide a light, simple instrument that can be moved along the rails of the track and will automatically indicate all variations in the gauge—the distance between the heads of the rails.

Generally speaking, this is accomplished by providing two overlapping or telescoping bars urged in opposite directions by spring and equipped at their free ends with supporting rollers to run on the rails and guiding rollers forced against the inside of the corresponding railheads by the spring, one bar having a scale and the other a pointer to indicate variations in gauge on the scale.

The preferred embodiment of the invention is shown in the accompanying drawing, in which—

Fig. 1 is a perspective view illustrating the use of the device on two rails of the track;

Fig. 2 is a cross section of the track showing the inspection gauge in side elevation thereon, intermediate portions being broken away to shorten the figure;

Fig. 3 is a horizontal section through the middle portion of the gauge, the ends being broken away;

Fig. 4 is a vertical section taken on the line 4—4 of Fig. 3; and

Fig. 5 is a perspective view of a handle used to push the inspection gauge along the rails.

But this specific drawing and the correspondingly specific description are used for the purpose of disclosure only and are not intended to impose unnecessary limitations on the claims.

The main bar 10 of the gauge is made of a suitable length of ⅜" galvanized iron pipe threaded into a T 11 equipped with short lengths of ⅜" pipe 12, each of which is screwed into a ⅜" to ⅛" reducer, shown as a street L 13 fitted into a ⅛" T 14, one branch of which is equipped with a horizontal nipple 15 of ⅛" pipe and the other of which is fitted with a shorter vertical nipple 16 also of ⅛" pipe. The two horizontal nipples 15 are equipped with sheet steel wheels 17 journaled on ball bearings on short shafts 18 made fast in the nipples.

The vertical nipples 16 are in a similar manner equipped with sheet steel wheels 19 adapted to rest against the inside of the railhead 20.

The main bar 10 is fitted with a wooden plug 21 (Fig. 3) which forms an abutment for a 5/16" by 8" compression spring 22, the right end of which bears against the inner end of the auxiliary bar 23 made of ⅛" galvanized iron pipe inserted within the main bar 10, as best shown in Figs. 1 and 3.

The outer or right end of the pipe 23 fits into the T 24 fitted with nipples 25 and 26 similar to nipples 15 and 16 and in like manner equipped with sheet steel supporting and guiding wheels 27 and 28.

The main bar 10 is provided with a slot 29 5/16" wide and 4" long, and a steel indicator pin 30 threaded into the pipe 23 projects through the slot 29 to indicate the condition of the gauge on a scale 31 secured to the main bar by clamps 32 and bolts 33.

The scale 31 has the zero or datum at the middle and is graduated in fractions of an inch towards each end. The left side in Fig. 3 is painted red and the right side is painted white.

In use, the inspection gauge is placed on the rails, as indicated in Figs. 1 and 2, and the proportions are such that this position requires the spring 22 to be compressed whereby it normally holds the guide rollers 19 and 28 against the inside faces of the opposing rails. If those faces are too wide apart, the pin 30 will move to the right and indicate the amount of the variance from standard gauge on the right side of the scale 31. If the railheads are too close together, the pin 30 will indicate the variance on the left side.

In order to facilitate moving the gauge along the track, a handle 34 ¾" in diameter and 3'6" long, made of wood and fitted with a forked clip 35, is placed in some such position as indicated in Fig. 1, and held in the inspector's hand as he walks along the track.

From the foregoing it will appear that the gauge is made of such light material that the ball bearing wheels can support it with a minimum of friction whereby it will run easily along the rails and adjust itself to the gauge and indicate the variations visibly to the track inspector.

The short lengths of ⅜" pipe, indicated by the reference numerals 12 on Fig. 1, might be replaced by bars or tubes of fiber to insulate the track gauge so that it would not operate the automatic signals. However, this specific way of insulating is only one of many that can be readily made.

I claim as my invention:

1. In a track gauge inspection device of the class wherein a main pipe section having a longitudinal slot therein and an auxiliary bar are telescopically associated with each other and resiliently urged apart by a spring reacting between the inner end of the bar and an abutment in the main pipe section and in which the outer ends of the bar and pipe section are provided with wheels for rolling along the rails of a track, the combination with said bar and pipe section of a track gauge scale plate clamped at its opposite ends beyond the ends of the slot in the pipe section inwardly of the spring, and a pointer pin extending radially from the bar and projecting through the solt and movable along the slot to prevent relative turning of the bar and pipe section and to cooperate with the scale plate to indicate variations in gauge as the device is moved along the track.

2. In a track gauge inspection device of the class wherein a main pipe line section having a longitudinal slot therein and an auxiliary bar are telescopically associated with each other and resiliently urged apart by a spring reacting between the inner end of the bar and an abutment in the main pipe section and in which the outer ends of the bar and pipe section are provided with wheels for rolling along the rails of a track, the combination with said bar and pipe section of a track gauge scale plate longitudinally and circumferentially adjustably clamped at its opposite ends beyond the ends of the slot formed in the pipe section inwardly of the spring, and a pointer pin extending radially from the bar and projecting through the slot and movable along the slot to prevent relative turning of the bar and pipe section and to cooperate with the scale plate to indicate variations in gauge as the device is moved along the track.

EDGAR FRANKLIN BOETTCHER.